US008600945B1

(12) United States Patent
Natanzon et al.

(10) Patent No.: US 8,600,945 B1
(45) Date of Patent: Dec. 3, 2013

(54) CONTINUOUS DATA REPLICATION

(75) Inventors: Assaf Natanzon, Tel Aviv (IL); Saar Cohen, Mishmeret (IL)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/434,447

(22) Filed: Mar. 29, 2012

(51) Int. Cl.
*G06F 17/00* (2006.01)

(52) U.S. Cl.
USPC .............................. 707/648; 711/162; 714/6.3

(58) Field of Classification Search
USPC ......... 707/610, 640, 641, 644, 648, 649, 674, 707/679, 682, 684, 613, 619, 639, 626; 711/162, 114, 152, 112, 156; 714/4.11, 714/6.3, 6.32, 13, E11.118, 38.1; 709/203, 709/204
See application file for complete search history.

(56) References Cited

U.S. PATENT DOCUMENTS

| | | | | |
|---|---|---|---|---|
| 5,435,004 A | * | 7/1995 | Cox et al. | 707/999.205 |
| 7,516,287 B2 | * | 4/2009 | Ahal et al. | 711/162 |
| 7,577,867 B2 | * | 8/2009 | Lewin et al. | 714/6.32 |
| 7,664,785 B2 | * | 2/2010 | Kano | 707/654 |
| 7,702,866 B2 | * | 4/2010 | Beardsley et al. | 711/162 |
| 8,103,937 B1 | * | 1/2012 | Natanzon et al. | 714/763 |
| 8,464,101 B1 | * | 6/2013 | Natanzon et al. | 714/38.1 |
| 2003/0188114 A1 | * | 10/2003 | Lubbers et al. | 711/162 |
| 2006/0136685 A1 | * | 6/2006 | Griv et al. | 711/162 |
| 2007/0220311 A1 | * | 9/2007 | Lewin et al. | 714/6 |
| 2007/0245107 A1 | * | 10/2007 | Kano | 711/163 |
| 2007/0283111 A1 | * | 12/2007 | Berkowitz et al. | 711/162 |
| 2008/0077918 A1 | * | 3/2008 | Powell et al. | 718/1 |
| 2008/0082770 A1 | * | 4/2008 | Ahal et al. | 711/162 |
| 2008/0320221 A1 | * | 12/2008 | Fujii | 711/114 |
| 2009/0313503 A1 | * | 12/2009 | Atluri et al. | 714/19 |
| 2010/0050013 A1 | * | 2/2010 | Soran et al. | 714/5 |
| 2010/0082715 A1 | * | 4/2010 | Dohm et al. | 707/822 |

OTHER PUBLICATIONS

Todd Hanson and Nitin Vengurlekar—Oracle Jun. 2007—"Oracle Database 10g Automatic Storage Management Best practices with Hitachi Replication Software on the Hitachi Universal Storage platform Family of Products"—An application brief from Hitachi Data Systems and Oracle (pp. 1-42).*
R. F. Kerm and V. T. Peitz—IBM Systems Group—Dec. 15, 2003—"IBM Storage Infrastructure for Business Continuity" (pp. 1-33).*

* cited by examiner

*Primary Examiner* — Jean B Fleurantin
*Assistant Examiner* — Anh Ly
(74) *Attorney, Agent, or Firm* — Krishnendu Gupta; Joseph D'Angelo

(57) ABSTRACT

In a first embodiment, computer implemented method and computer program product for executing an action selected from the group consisting of removing a LUN from a consistency group on a production site and adding a LUN to a consistency group on a production site; wherein the action is performed without loss of a journal tracking the changes to the consistency group at a replication site, the replication site replicating the consistency group on the production site.

20 Claims, 14 Drawing Sheets

CONTINUOUS DATA REPLICATION

CONTINUOUS DATA REPLICATION

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data replication.

BACKGROUND

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

Continuous data protection typically uses a technology referred to as "journaling," whereby a log is kept of changes made to the backup storage. During a recovery, the journal entries serve as successive "undo" information, enabling rollback of the backup storage to previous points in time. Journaling was first implemented in database systems, and was later extended to broader data protection.

One challenge to continuous data protection is the ability of a backup site to keep pace with the data transactions of a production site, without slowing down the production site. The overhead of journaling inherently requires several data transactions at the backup site for each data transaction at the production site. As such, when data transactions occur at a high rate at the production site, the backup site may not be able to finish backing up one data transaction before the next production site data transaction occurs. If the production site is not forced to slow down, then necessarily a backlog of un-logged data transactions may build up at the backup site. Without being able to satisfactorily adapt dynamically to changing data transaction rates, a continuous data protection system chokes and eventually forces the production site to shut down.

SUMMARY

In a first embodiment, computer implemented method and computer program product for executing an action selected from the group consisting of removing a LUN from a consistency group on a production site and adding a LUN to a consistency group on a production site; wherein the action is performed without loss of a journal tracking the changes to the consistency group at a replication site, the replication site replicating the consistency group on the production site.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
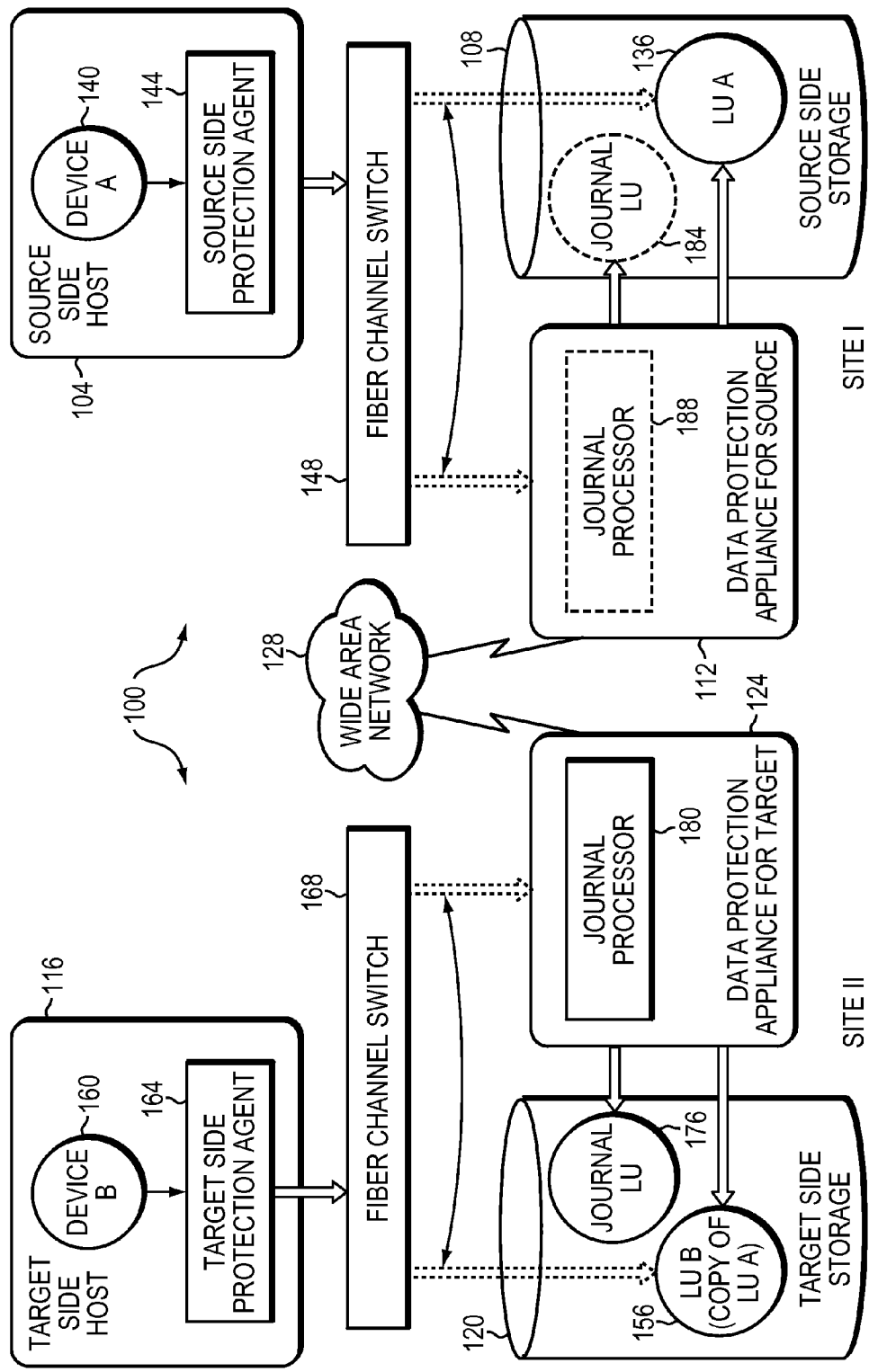
FIG. 1 is a simplified illustration of a data protection system, in accordance with an embodiment of the present invention.

Typically in journal based replication, adding or removing a replicated LUN may be problematic. Generally, if a LUN is added to a production site to be replicated, it may need to be ensured that if a point in time (PIT) of the replication is accessed before the LUN was added, that the LUN not be available for IO. Usually, if a LUN is removed from a production site, the LUN may need to be accessed at the replication site if a PIT is accessed before the LUN was removed.

In an embodiment of the current disclosure, a LUN may be added to LUNs being replicated. In another embodiment, a LUN may be added to a consistency group to be replicated. In most embodiments, it may be ensured that if a PIT in time before the LUN was added to the replication, the added LUN may not be accessed.

In some embodiments of the current disclosure, a LUN may be removed from a group of LUNs being replicated. In another embodiment, a LUN may be removed from a consistency group being replicated. In certain embodiments when a LUN is removed, the data associated with the LUN may not be removed from the replication. In a particular embodiment, the LUN may be kept as a shadow LUN and may not be generally accessible. In another embodiment, a snapshot of the removed LUN may be taken and the removed LUN may be erased or repurposed. In a further embodiment, the data in the removed LUN may be copied to a journal. In most embodiments, the data in the removed LUN may be removed when the removal of the LUN occurred outside the replication protection window.

The following may be helpful in understanding the specification and claims:

BACKUP SITE—may be a facility where replicated production site data is stored; the backup site may be located in a remote site or at the same location as the production site;

CLONE—a clone may be a copy or clone of the image or images, drive or drives of a first location at a second location;

DELTA MARKING STREAM—may mean the tracking of the delta between the production and replication site, which may contain the meta data of changed locations, the delta marking stream may be kept persistently on the journal at the production site of the replication, based on the delta marking data the DPA knows which locations are different between the production and the replica and transfers them to the replica to make both sites identical.

DPA—may be Data Protection Appliance a computer or a cluster of computers, or a set of processes that serve as a data protection appliance, responsible for data protection services including inter alia data replication of a storage system, and journaling of I/O requests issued by a host computer to the storage system; The DPA may be a physical device, a virtual device running, or may be a combination of a virtual and physical device.

RPA—may be replication protection appliance, is another name for DPA.

HOST—may be at least one computer or networks of computers that runs at least one data processing application that issues I/O requests to one or more storage systems; a host is an initiator with a SAN;

HOST DEVICE—may be an internal interface in a host, to a logical storage unit;

IMAGE—may be a copy of a logical storage unit at a specific point in time;

INITIATOR—may be a node in a SAN that issues I/O requests;

JOURNAL—may be a record of write transactions issued to a storage system; used to maintain a duplicate storage system, and to rollback the duplicate storage system to a previous point in time;

LOGICAL UNIT—may be a logical entity provided by a storage system for accessing data from the storage system;

LUN—may be a logical unit number for identifying a logical unit; may also refer to one or more virtual disks or virtual LUNs, which may correspond to one or more Virtual Machines.

PHYSICAL STORAGE UNIT—may be a physical entity, such as a disk or an array of disks, for storing data in storage locations that can be accessed by address;

PRODUCTION SITE—may be a facility where one or more host computers run data processing applications that write data to a storage system and read data from the storage system;

SAN—may be a storage area network of nodes that send and receive I/O and other requests, each node in the network being an initiator or a target, or both an initiator and a target;

SOURCE SIDE—may be a transmitter of data within a data replication workflow, during normal operation a production site is the source side; and during data recovery a backup site is the source side;

SNAPSHOT—a Snapshot may refer to differential representations of an image, i.e. the snapshot may have pointers to the original volume, and may point to log volumes for changed locations. Snapshots may be combined into a snapshot array, which may represent different images over a time period.

STORAGE SYSTEM—may be a SAN entity that provides multiple logical units for access by multiple SAN initiators TARGET—may be a node in a SAN that replies to I/O requests;

TARGET SIDE—may be a receiver of data within a data replication workflow; during normal operation a back site is the target side, and during data recovery a production site is the target side;

WAN—may be a wide area network that connects local networks and enables them to communicate with one another, such as the Internet.

SPLITTER/PROTECTION AGENT: may be an agent running either on a production host a switch or a storage array which can intercept IO and split them to a DPA and to the storage array, fail IO redirect IO or do any other manipulation to the IO; the splitter or protection agent may be used in both physical and virtual systems. The splitter may be in the IO stack of a system and may be located in the hypervisor for virtual machines.

VIRTUAL VOLUME: may be a volume which is exposed to host by a virtualization layer, the virtual volume may be spanned across more than one site DISTRIBUTED MIRROR: may be a mirror of a volume across distance, either metro or geo, which is accessible at all sites.

BLOCK VIRTUALIZATION: may be a layer, which takes backend storage volumes and by slicing concatenation and striping create a new set of volumes, which serve as base volumes or devices in the virtualization layer MARKING ON SPLITTER: may be a mode in a splitter where intercepted IOs are not split to an appliance and the storage, but changes (meta data) are tracked in a list and/or a bitmap and I/O is immediately sent to down the IO stack.

FAIL ALL MODE: may be a mode of a volume in the splitter where all write and read IOs intercepted by the splitter are failed to the host, but other SCSI commands like read capacity are served.

GLOBAL FAIL ALL MODE: may be a mode of a volume in the virtual layer where all write and read IOs virtual layer are failed to the host, but other SCSI commands like read capacity are served.

LOGGED ACCESS: may be an access method provided by the appliance and the splitter, in which the appliance rolls the volumes of the consistency group to the point in time the user requested and let the host access the volumes in a copy on first write base.

VIRTUAL ACCESS: may be an access method provided by the appliance and the splitter, in which the appliance exposes a virtual volume from a specific point in time to the host, the data for the virtual volume is partially stored on the remote copy and partially stored on the journal.

CDP: Continuous Data Protection, may refer to a full replica of a volume or a set of volumes along with a journal which allows any point in time access, the CDP copy is at the same site, and maybe the same storage array of the production site.

CRR: Continuous Remote Replica may refer to a full replica of a volume or a set of volumes along with a journal which allows any point in time access at a site remote to the production volume and on a separate storage array.

A description of journaling and some techniques associated with journaling may be described in the patent titled METHODS AND APPARATUS FOR OPTIMAL JOURNALING FOR CONTINUOUS DATA REPLICATION and with U.S. Pat. No. 7,516,287, which is hereby incorporated by reference.

A discussion of image access may be found in U.S. patent application Ser. No. 12/969,903 entitled "DYNAMIC LUN RESIZING IN A REPLICATION ENVIRONMENT" filed on Dec. 16, 2010 assigned to EMC Corp., which is hereby incorporated by reference.

A discussion of journal based replication may be integrated with a virtual service layer. may be found in U.S. patent application Ser. Nos. 13/077,256, 13/077,262, and 13/077,266, entitled "CONSISTENT REPLICATION IN A GEOGRAPHICALLY DISPERSE ACTIVE ENVIRONMENT," "INVERSE STAR REPLICATION," and "NETWORKED BASED REPLICATION OF DISTRIBUTED VOLUMES," respectively, filed on Dec. 16, 2010 assigned to EMC Corp., which is hereby incorporated by reference.

Description of Embodiments Using of a Five State Journaling Process

Reference is now made to FIG. 1, which is a simplified illustration of a data protection system 100, in accordance with an embodiment of the present invention. Shown in FIG. 1 are two sites; Site I, which is a production site, on the right, and Site II, which is a backup site, on the left. Under normal operation the production site is the source side of system 100, and the backup site is the target side of the system. The backup site is responsible for replicating production site data. Additionally, the backup site enables rollback of Site I data to an earlier pointing time, which may be used in the event of data corruption of a disaster, or alternatively in order to view or to access data from an earlier point in time.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks are also adaptable for use with the present invention.

In accordance with an embodiment of the present invention, each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

In an embodiment of the present invention, the host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. A logical unit is identified by a unique logical unit number (LUN). In an embodiment of the present invention, storage system 108 exposes a logical unit 136, designated as LU A, and storage system 120 exposes a logical unit 156, designated as LU B.

In an embodiment of the present invention, LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, in certain embodiments of the present invention, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. In an embodiment of the present invention, host device 104 identifies LU A and generates a corresponding host device 140, designated as Device A, through which it can access LU A. Similarly, host computer 116 identifies LU B and generates a corresponding device 160, designated as Device B.

In an embodiment of the present invention, in the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail hereinbelow, when acting as a target side DPA, a DPA may also enable rollback of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

In accordance with an embodiment of the present invention, DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

In accordance with an embodiment of the present invention, host computer 104 and host computer 116 include protection agents 144 and 164, respectively. Protection agents 144 and 164 intercept SCSI commands issued by their respective host computers, via host devices to logical units that are accessible to the host computers. In accordance with an embodiment of the present invention, a data protection agent may act on an intercepted SCSI commands issued to a logical unit, in one of the following ways:

Send the SCSI commands to its intended logical unit.

Redirect the SCSI command to another logical unit.

Split the SCSI command by sending it first to the respective DPA. After the DPA returns an acknowledgement, send the SCSI command to its intended logical unit.

Fail a SCSI command by returning an error return code.

Delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. In an embodiment of the present invention, protection agents communicate with their respective DPAs by sending SCSI commands over fiber channel.

In an embodiment of the present invention, protection agents 144 and 164 are drivers located in their respective host computers 104 and 116. Alternatively, a protection agent may also be located in a fiber channel switch, or in any other device situated in a data path between a host computer and a storage system.

What follows is a detailed description of system behavior under normal production mode, and under recovery mode.

In accordance with an embodiment of the present invention, in production mode DPA 112 acts as a source site DPA for LU A. Thus, protection agent 144 is configured to act as a source side protection agent; i.e., as a splitter for host device A. Specifically, protection agent 144 replicates SCSI I/O requests. A replicated SCSI I/O request is sent to DPA 112. After receiving an acknowledgement from DPA 124, protection agent 144 then sends the SCSI I/O request to LU A. Only after receiving a second acknowledgement from storage system 108 may host computer 104 initiate another I/O request.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, in accordance with an embodiment of the present invention, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

In accordance with an embodiment of the present invention, target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 (i) enters write transactions received by DPA 124 from DPA 112 into the journal, by writing them into the journal LU, (ii) applies the journal transactions to LU B, and (iii) updates the journal entries in the journal LU with undo information and removes already-applied transactions from the journal. As described below, with reference to FIGS. 2 and 3A-3D, journal entries include four streams, two of which are written when write transaction are entered into the journal, and two of which are written when write transaction are applied and removed from the journal.

Figure 2:
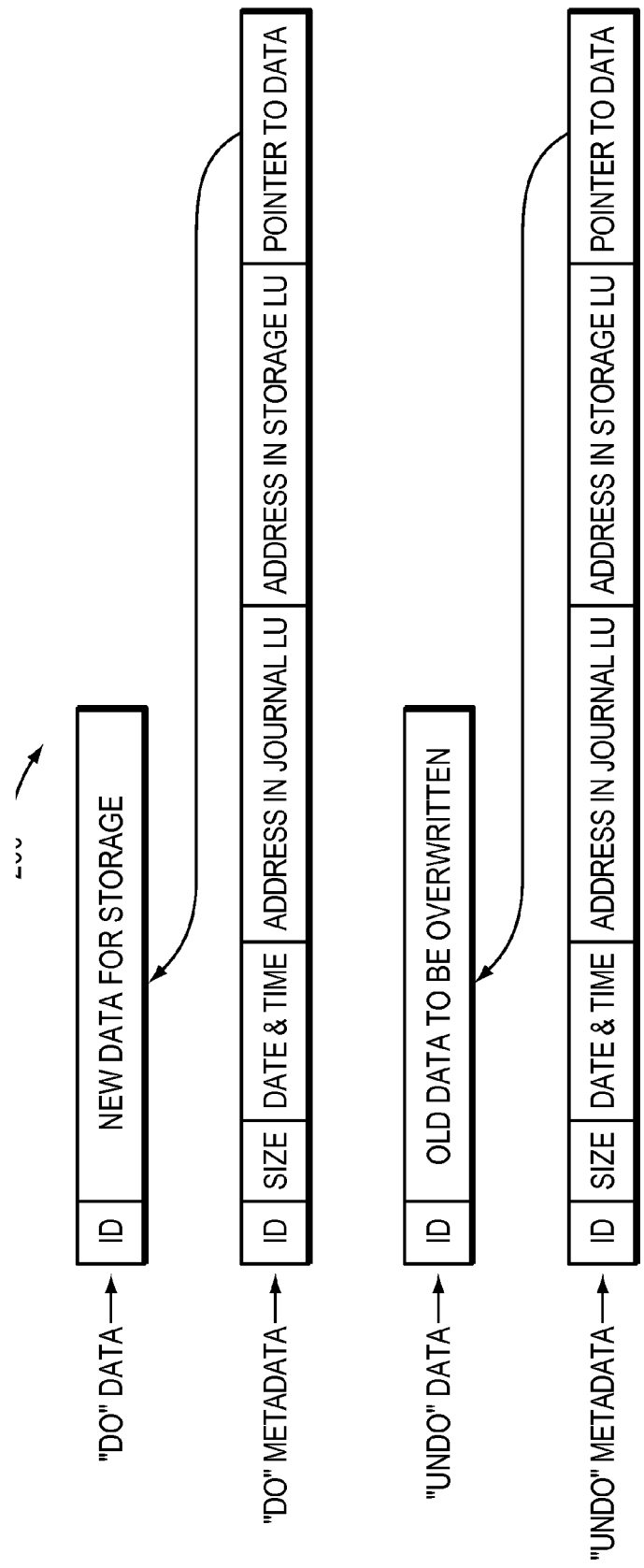
FIG. 2 is a simplified illustration of a write transaction for a journal, in accordance with an embodiment of the present invention.

Reference is now made to FIG. 2, which is a simplified illustration of a write transaction 200 for a journal, in accordance with an embodiment of the present invention. The journal may be used to provide an adaptor for access to storage 120 at the state it was in at any specified point in time. Since the journal contains the "undo" information necessary to rollback storage system 120, data that was stored in specific memory locations at the specified point in time may be obtained by undoing write transactions that occurred subsequent to such point in time.

Write transaction 200 generally includes the following fields:
one or more identifiers;
a time stamp, which is the date & time at which the transaction was received by source side DPA 112;
a write size, which is the size of the data block;
a location in journal LU 176 where the data is entered;
a location in LU B where the data is to be written; and
the data itself.

Write transaction 200 is transmitted from source side DPA 112 to target side DPA 124. As shown in FIG. 2, DPA 124 records the write transaction 200 in four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the do stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the undo stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream in a reverse order, from the most recent data to the oldest data, for writing into addresses within LU B. Prior to writing the UNDO data into these addresses, the newer data residing in such addresses is recorded in the DO stream.

The journal LU is partitioned into segments with a predefined size, such as 1 MB segments, with each segment identified by a counter. The collection of such segments forms a segment pool for the four journaling streams described hereinabove. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 124, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

A journal may be made of any number of streams including less than or more than 5 streams. Often, based on the speed of the journaling and whether the back-up is synchronous or a synchronous a fewer or greater number of streams may be used.

Image Access

Herein, some information is provided for conventional continuous data protection systems having journaling and a replication splitter which may be used in one or more embodiments is provided. A replication may set refer to an association created between the source volume and the local and/or remote target volumes, and a consistency group contains one or more replication sets. A snapshot may be the difference between one consistent image of stored data and the next. The exact time for closing the snapshot may determined dynamically depending on replication policies and the journal of the consistency group.

In synchronous replication, each write may be a snapshot. When the snapshot is distributed to a replica, it may be stored in the journal volume, so that is it possible to revert to previous images by using the stored snapshots. As noted above, a splitter minors may write from an application server to LUNs being protected by the data protection appliance. When a write is requested from the application server it may be split and sent to the appliance using a host splitter/driver (residing in the I/O stack, below any file system and volume manager, and just above any multipath driver (such as EMC POWERPATH), through an intelligent fabric switch, through array-based splitter, such as EMC CLARiiON.

There may be a number of image access modes. Image access may be used to restore production from the disaster recovery site, and to roll back to a previous state of the data. Image access may be also to temporarily operate systems from a replicated copy while maintenance work is carried out on the production site and to fail over to the replica. When image access is enabled, host applications at the copy site may be able to access the replica.

In virtual access, the system may create the image selected in a separate virtual LUN within the data protection appliance. While performance may be constrained by the appliance, access to the point-in-time image may be nearly instantaneous. The image may be used in the same way as logged access (physical), noting that data changes are temporary and stored in the local journal. Generally, this type of image access is chosen because the user may not be sure which image, or point in time is needed. The user may access several images to conduct forensics and determine which replica is required. Note that in known systems, one cannot recover the production site from a virtual image since the virtual image is temporary. Generally, when analysis on the virtual image is completed, the choice is made to disable image access.

If it is determined the image should be maintained, then access may be changed to logged access using 'roll to image.' When disable image access is disabled, the virtual LUN and all writes to it may be discarded.

In an embodiment of virtual access with roll image in background, the system first creates the image in a virtual volume managed by the data protection appliance to provide rapid access to the image, the same as in virtual access. Simultaneously in background, the system may roll to the physical image. Once the system has completed this action, the virtual volume may be discarded, and the physical volume may take its place. At this point, the system continues to function as if logged image access was initially selected. The switch from virtual to physical may be transparent to the servers and applications and the user may not see any difference in access. Once this occurs, changes may be read from the physical volume instead of being performed by the appliance. If image access is disabled, the writes to the volume while image access was enabled may be rolled back (undone). Then distribution to storage may continue from the accessed image forward.

In some embodiments in physical logged access, the system rolls backward (or forward) to the selected snapshot (point in time). There may be a delay while the successive snapshots are applied to the replica image to create the selected image. The length of delay may depend on how far the selected snapshot is from the snapshot currently being distributed to storage. Once the access is enabled, hosts may read data directly from the volume and writes may be handled through the DPA. The host may read the undo data of the write and the appliance may store the undo data in a logged access journal. During logged access the distribution of snapshots from the journal to storage may be paused. When image access is disabled, writes to the volume while image access was enabled (tracked in the logged access journal) may be rolled back (undone). Then distribution to storage may continue from the accessed snapshot forward.

Disable image access may mean changes to the replica may be discarded or thrown away. It may not matter what type of access was initiated, that is, logged or another type, or whether the image chosen was the latest or an image back in time. Disable image access effectively says the work done at the disaster recovery site is no longer needed.

Delta Marking

A delta marker stream may contain the locations that may be different between the latest I/O data which arrived to the remote side (the current remote site) and the latest I/O data which arrived at the local side. In particular, the delta marking stream may include metadata of the differences between the source side and the target side. For example, every I/O reaching the data protection appliance for the source 112 may be written to the delta marking stream and data is freed from the delta marking stream when the data safely arrives at both the source volume of replication 108 and the remote journal 180 (e.g. DO stream). Specifically, during an initialization process no data may be freed from the delta marking stream; and only when the initialization process is completed and I/O data has arrived to both local storage and the remote journal data, may be I/O data from the delta marking stream freed. When the source and target are not synchronized, data may not be freed from the delta marking stream. The initialization process may start by merging delta marking streams of the target and the source so that the delta marking stream includes a list of all different locations between local and remote sites. For example, a delta marking stream at the target might have data too if a user has accessed an image at the target site.

The initialization process may create one virtual disk out of all the available user volumes. The virtual space may be divided into a selected number of portions depending upon the amount of data needed to be synchronized. A list of 'dirty' blocks may be read from the delta marker stream that is relevant to the area currently being synchronized to enable creation of a dirty location data structure. The system may begin synchronizing units of data, where a unit of data is a constant amount of dirty data, e.g., a data that needs to be synchronized.

The dirty location data structure may provide a list of dirty location until the amount of dirty location is equal to the unit size or until there is no data left. The system may begin a so-called ping pong process to synchronize the data. The process may transfer the differences between the production and replica site to the replica.

Adding LUNs

In certain embodiments, if may be beneficial to add a LUN or virtual LUN to a consistency group or group of LUNs being replicated. In some embodiments, if the LUN or virtual LUN is added to be replicated, it may need to be ensured that that the LUN may not be accessed if the replication image, consisting of one or more replicated LUNs, is rolled to a point in time before the LUN was added. In some embodiments, a checkpoint may be added in a replication journal to note when a LUN is added. In certain embodiments, the LUN data may be marked as dirty. In further embodiments, after a LUN is added the LUNs data may be synchronized to the replication site.

Figure 3:
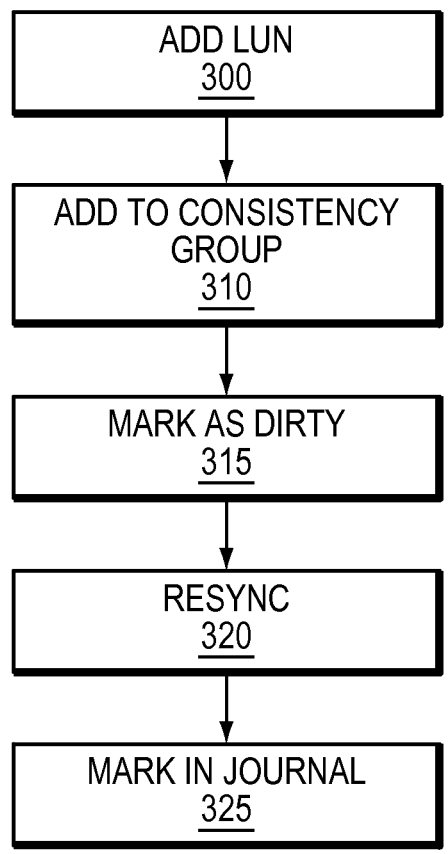
FIG. 3 is a simplified method of adding a LUN to a replicated consistency group, in accordance with an embodiment of the present invention.
Figure 4:
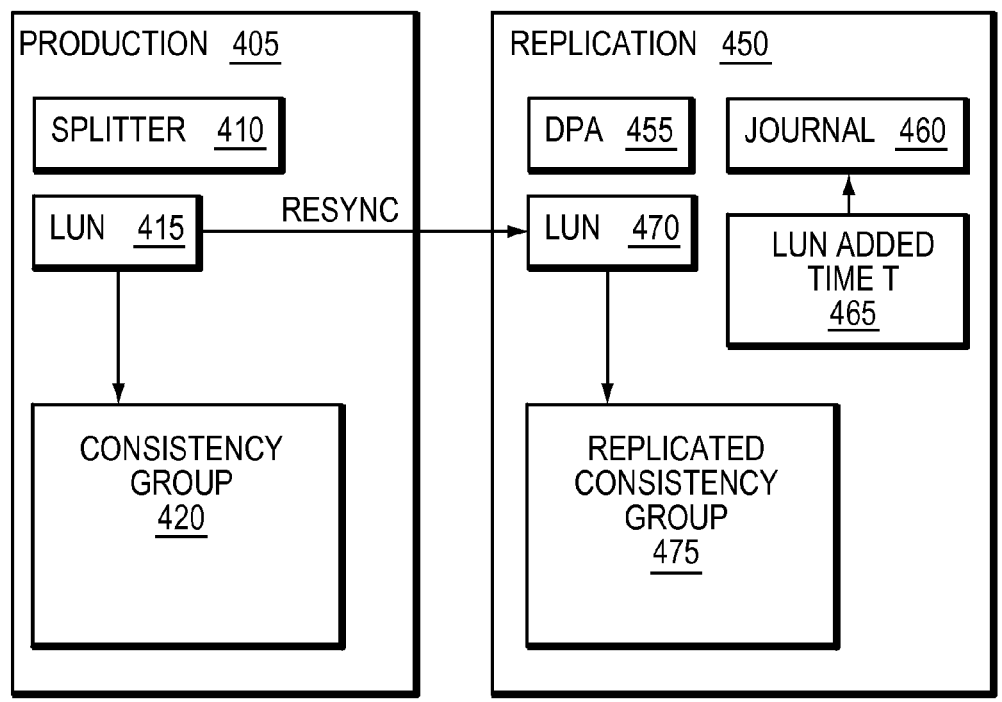
FIG. 4 is a simplified illustration of a data protection system with a consistency group and replicated consistency group, in accordance with an embodiment of the present invention.

Refer now to the example embodiments of FIGS. 3 and 4. In these embodiments, LUN 415 is added on production site 405 and as LUN 470 on replication site 450 (step 300). LUN 415 is added to consistency group 420 denoting that LUN 415 is being replicated (Step 310). The data in LUN 470 is marked as dirty on production site 450 delta marker (step 315). Checkpoint 465 is added in journal 460 denoting when LUN 415 was added to consistency group 420 (step 320), when the checkpoint is distributed from the do stream to the undo stream, the add LUN message is replaced with the inverse of LUN addition, i.e. LUN removal. LUN 415 is resynchronized between production site 405 and replication site 450 (step 325).

Figure 5:
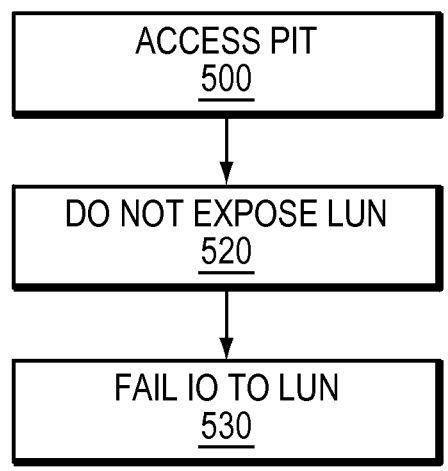
FIG. 5 is a simplified method of accessing a point in time (PIT), in accordance with an embodiment of the present invention.
Figure 6:
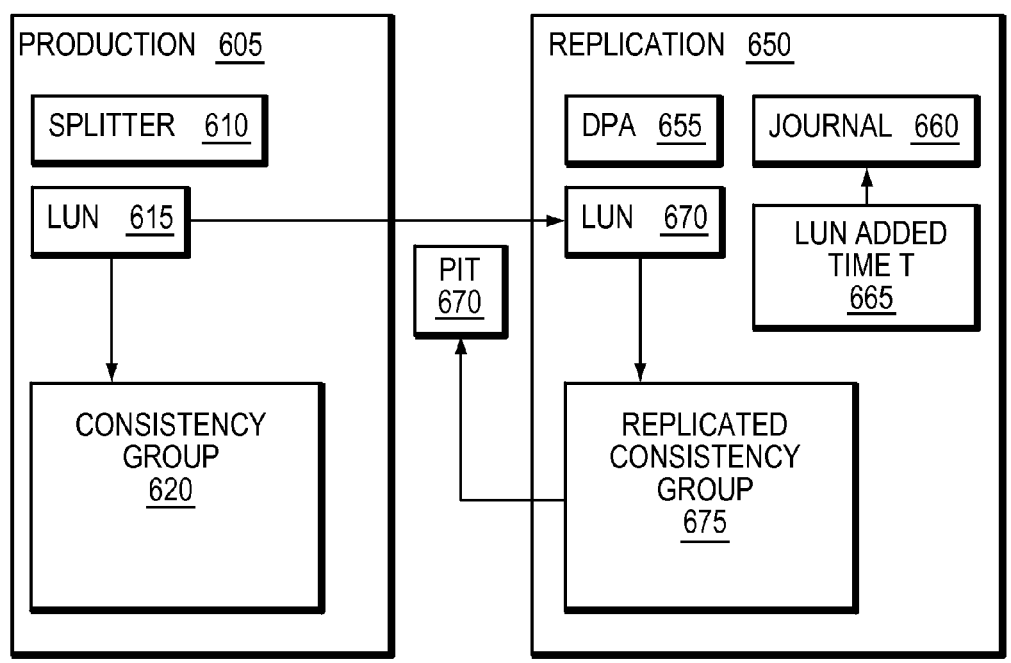
FIG. 6 is a simplified illustration of accessing a PIT in a data protection system with a consistency group and replicated consistency group, in accordance with an embodiment of the present invention.

Refer now to the example embodiments of FIGS. 5 and 6. In these example embodiments, a point of time is accessed before the LUN was added to the consistency group (step 500). The added LUN is not exposed to the user (step 520). If IO is sent to the added LUN, then the IO is failed (step 530). The system knows the PIT is before the LUN was added because of the bookmark indicating the addition of the LUN.

Removing LUNs

In some embodiments, a LUN may be removed from a replication group, and production copy of the LUN may be deleted. In most embodiments, from the point in time when the LUN is removed, no IO to the LUN may be tracked. In certain embodiments, it may be necessary to access a point in time before the LUN was removed and it may be necessary to access the data in the removed LUN. In particular embodiments, the replica of the LUN may be marked as a shadow LUN in the consistency group after it is removed from the production site. In other embodiments, a snapshot of the replica removed LUN may be taken and the replica LUN may be removed or repurposed (once the distribution rolled the system to the point in time the LUN was removed). In further embodiments, the data in the replica of the removed LUN may be copied to a journal and the replica LUN may be deleted or repurposed (once the distribution rolled the system to the point in time the LUN was removed).

Figure 7:
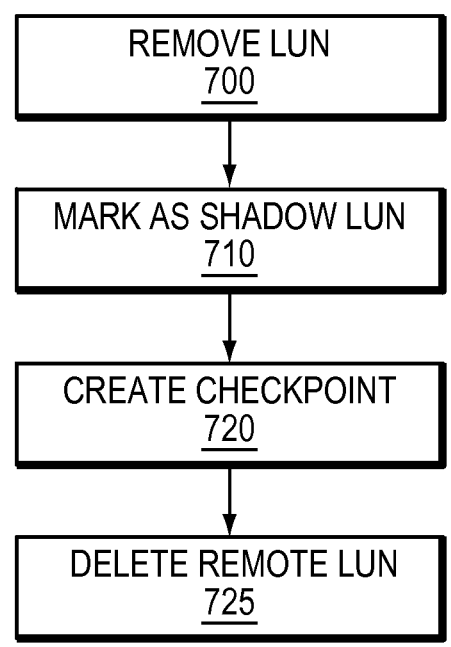
FIG. 7 is a simplified method of removing a LUN from a replicated consistency group, in accordance with an embodiment of the present invention.
Figure 8:
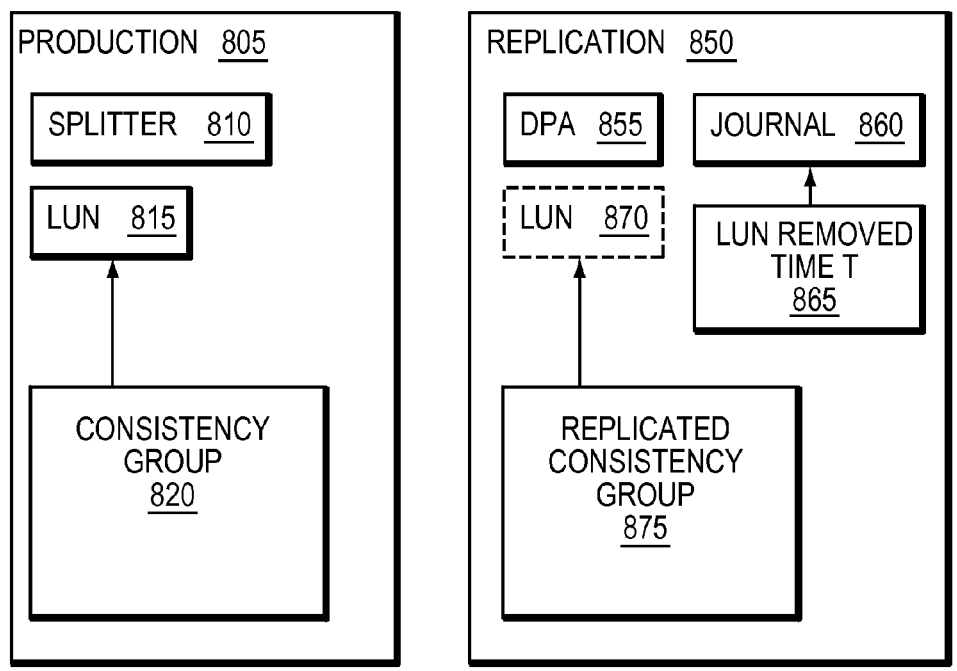
FIG. 8 is a simplified illustration of removing a LUN from a data protection system with a consistency group and replicated consistency group, in accordance with an embodiment of the present invention.

Refer now to the example embodiments of FIGS. 7 and 8. In these embodiments, LUN 815 is removed from production site 805 (step 700). Replication site 850 may mark LUN 870 as a shadow LUN, making shadow LUN 870 generally inaccessible (step 710). Checkpoint 865 is created in journal 860 denoting the removal of LUN 870 (step 720). Replication site 850 may determine that the time LUN 870 was removed from the system is outside the replication protection window, i.e. the time LUN 815 was erased (checkpoint 865) and is no longer protected in the journal and may erase LUN 870 (step 725).

In an alternative embodiment, a snapshot of the LUN 870 may be taken and the replication site may repurpose the LUN 870 and keep the snapshot as a shadow for the LUN. In a further embodiment, the replication site may copy the data in the LUN 870 into the journal, checkpoint 865 is distributed from the journal and created an add LUN checkpoint 625 in the undo stream, and let the removed LUN 870 be erased or repurposed. In these embodiments, once the removal of the LUN is outside the protection window, the data corresponding to the LUN may be discarded.

Figure 9:
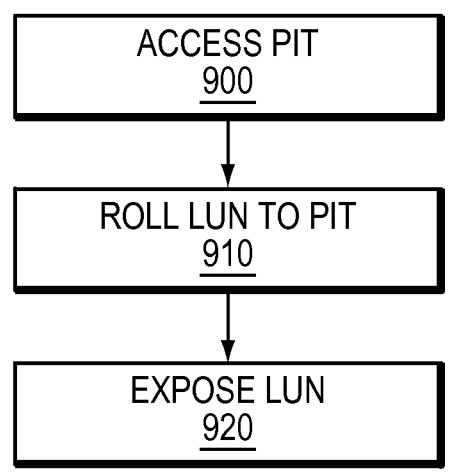
FIG. 9 is an alternative embodiment of a simplified method of accessing a PIT, in accordance with an embodiment of the present invention.
Figure 10:
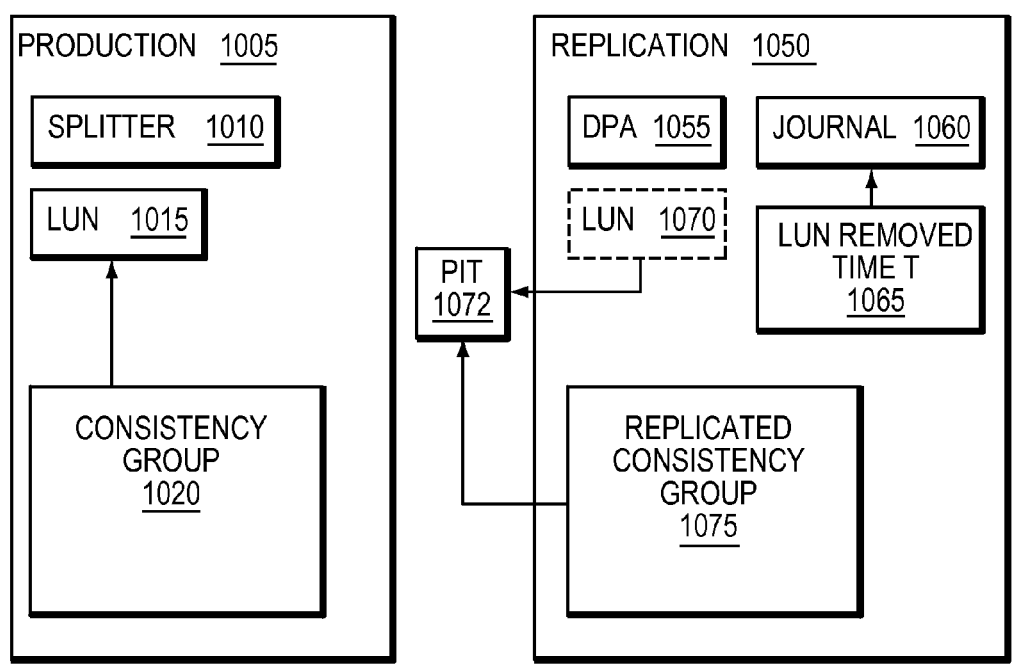
FIG. 10 is an alternative simplified illustration of accessing a PIT in data protection system with a consistency group and replicated consistency group, in accordance with an embodiment of the present invention.

Refer now to the example embodiments of FIGS. 9 and 10. In these embodiments, point in time 1072 may be accessed before LUN 1015 was removed (step 900). Using journal 1060, shadow LUN 1070 may be rolled to the appropriate point in time (step 910). Shadow LUN 1070 may be exposed to the user (step 920).

In certain embodiments, the replication system recognizes removal/addition of a LUN in the checkpoints. In some embodiments, the distribution intercepts a remove LUN command in the DO stream it writes as an add LUN command in the undo stream. In certain embodiments, if the data from the LUN was copied to the journal and LUN was erased, when rolling to a point in time before the erasure, the system may create a new LUN which may serve as a target for the data that was in LUN. In at least some embodiments, if the point in time access is reverted, once the LUN removal message may be identified in the journal the data is copied again from the LUN and LUN is erased again.

Figure 11:
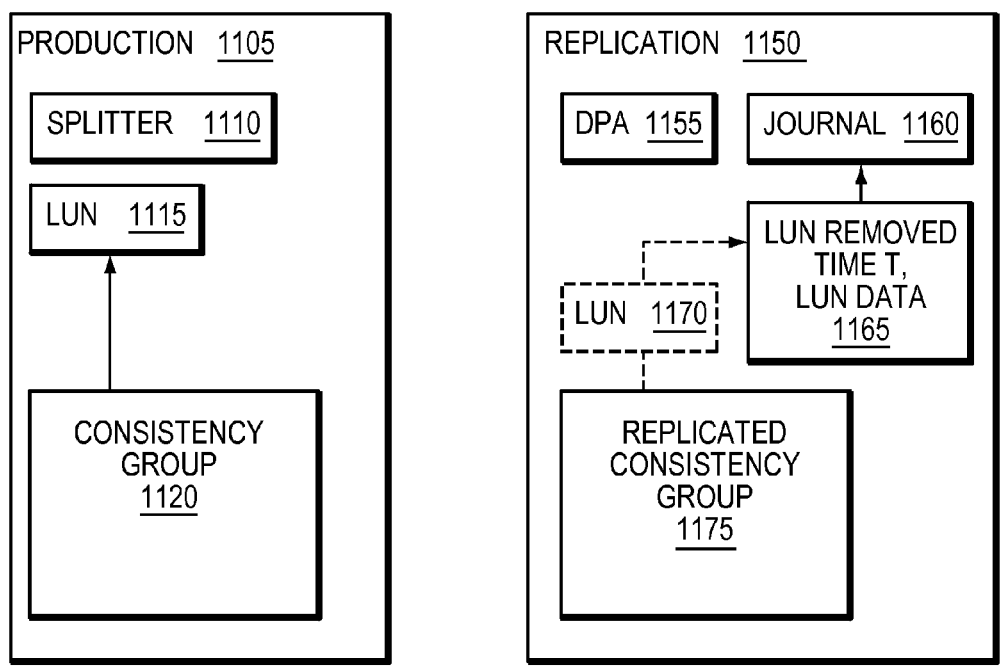
FIG. 11 is a further alternative simplified illustration of accessing a PIT in data protection system with a consistency group and replicated consistency group, in accordance with an embodiment of the present invention.
Figure 12:
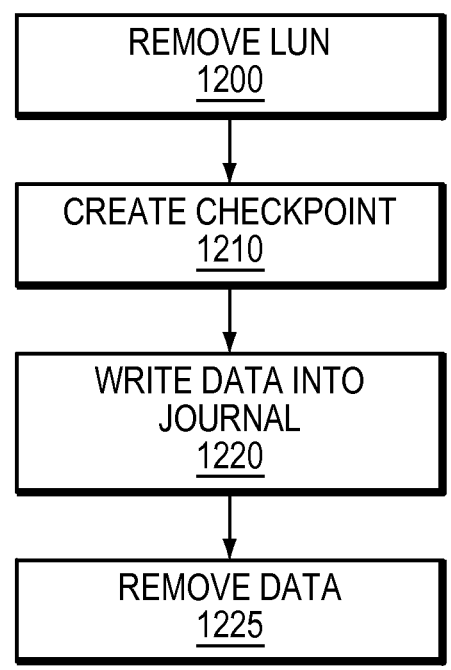
FIG. 12 is a simplified method of adding a LUN to a replicated consistency group, in accordance with an embodiment of the present invention.

Refer now to the example embodiments of FIGS. 11 and 12. In these embodiments, LUN 1115 has been removed from consistency group 1120 on production site. LUN 1070 is deleted from the consistency group 1175 and the data from the LUN is read into journal 1160. In some embodiments, the copying may be performed after the remove command is distributed from the do stream to the undo stream.

Figure 13:
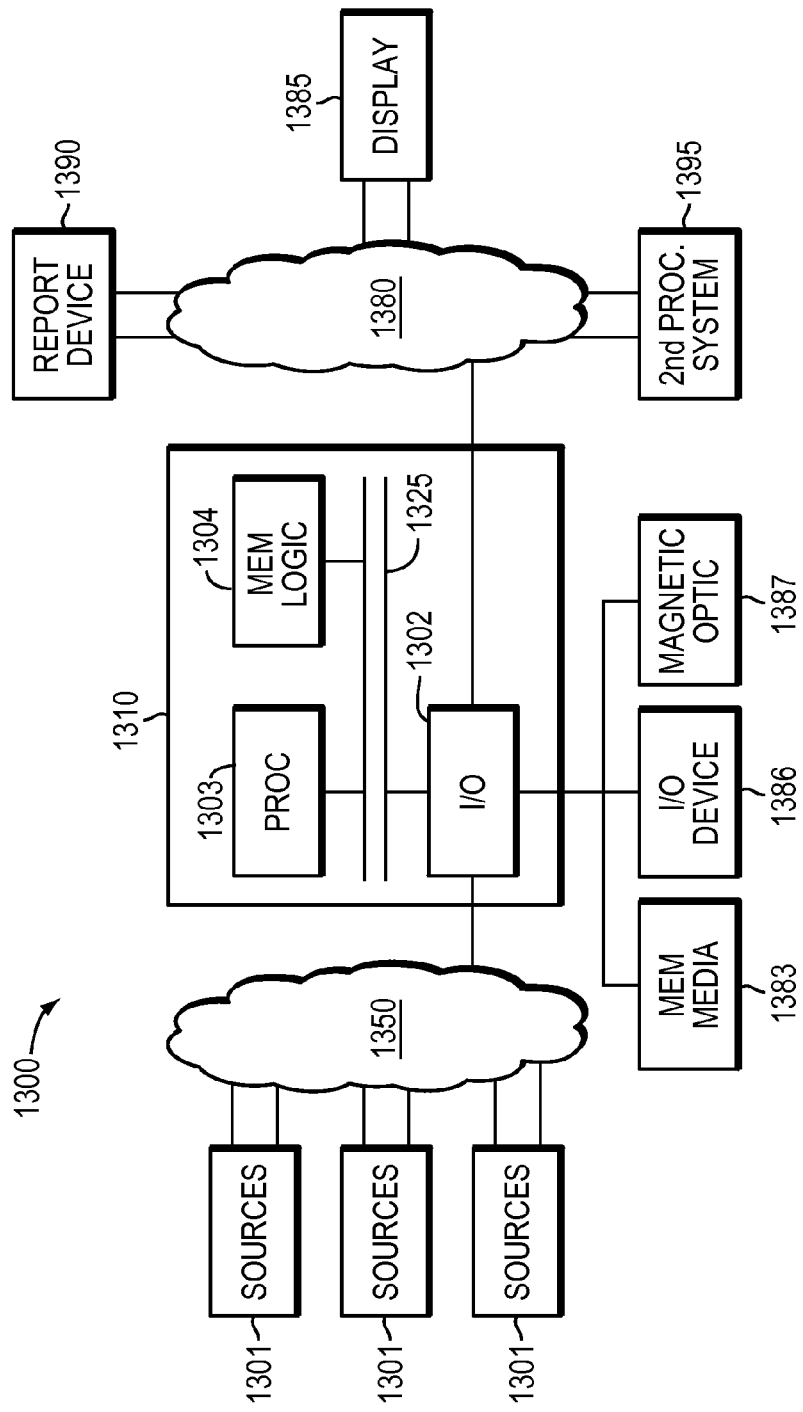
FIG. 13 is an example of an embodiment of an apparatus that may utilize the techniques described herein, in accordance with an embodiment of the present disclosure.
Figure 14:
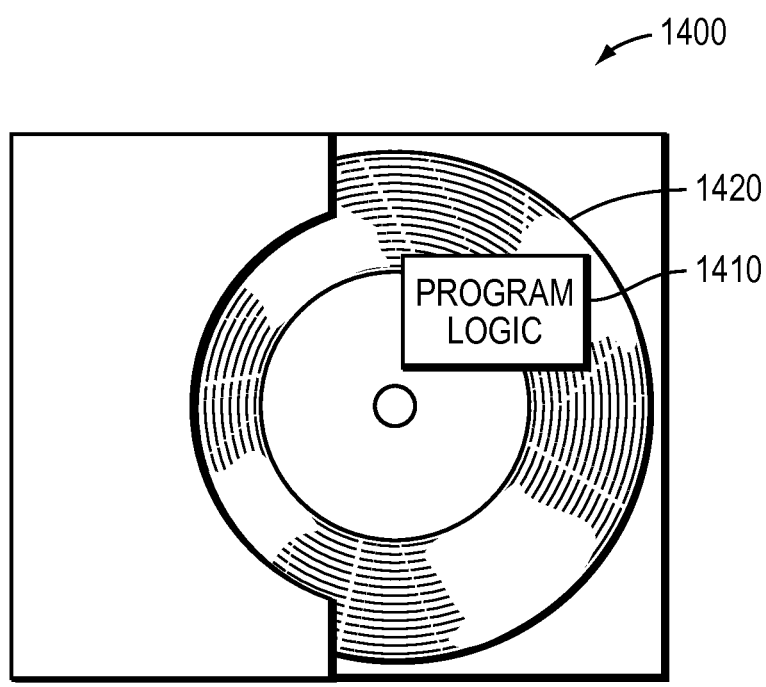
FIG. 14 is an example of an embodiment of a method embodied on a computer readable storage medium that may utilize the techniques described herein, in accordance with an embodiment of the present invention.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as the computer of FIG. 13, the machine becomes an apparatus for practicing the invention. When implemented on one or more general-purpose processors, the program code combines with such a processor 1303 to provide a unique apparatus that operates analogously to specific logic circuits. As such a general purpose digital machine can be transformed into a special purpose digital machine. FIG. 14 shows Program Logic 1434 embodied on a computer-readable medium 1430 as shown, and wherein the Logic is encoded in computer-executable code configured for carrying out the reservation service process of this invention and thereby forming a Computer Program Product 1400. The logic 1434 may be the same logic 1340 on memory 1304 loaded on processor 1303. The program logic may also be embodied in software modules, as modules, or as hardware modules. In certain embodiments, the program logic may be executed on one or more virtual processors, virtual machines, and/or virtual servers.

The logic for carrying out the method may be embodied as part of the system described below, which is useful for carrying out a method described with reference to embodiments shown in, for example, FIG. 5 and FIG. 7. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A computer program product for use in journal based replication replicating a consistency group on a production site to a replicated consistency group on a replication site; wherein each of the consistency groups is enabled to comprise Logical Unit Numbers (LUNs); the program product comprising:
a non-transitory computer readable medium encoded with computer executable program code for execution on one or more processors for replication of data, the code configured to enable execution of:
executing an action selected from a group consisting of removing a LUN from the consistency group on the production site and adding a LUN to the consistency group on the production site; wherein a copy of Input/Output (IO) directed to the consistency group on the production site is split to the replication site; wherein the action is performed maintaining a journal on the replication site tracking the changes to the consistency group at the production site on the replication site; wherein the journal enables the replicated consistency group on the replication site to be rolled to a Point In Time (PIT) within a protection window by applying data in the journal to the consistency group;
rolling the replicated consistency group on the replication site to a PIT using the journal;
determining if the time of the PIT is before the time the LUN was added;
based on a negative determination that the PIT is before the time the LUN was added, exposing the consistency group at the PIT on the replication site; and
based on a positive determination; not exposing the added LUN in the consistency group at exposed PIT.

2. The computer program product of claim 1 wherein the selected action is removing the LUN from the consistency group and the code is further configured to enable:
marking the LUN as removed on the replication site in a do portion of the journal on the replication site; and
making the LUN unavailable on the replication site once a remove LUN command is applied from the do portion of the journal;
enabling access to a point in time within the protection window containing the removed LUN.

3. The computer program product of claim 2 wherein the code is further configured to enable:
rolling the replicated consistency group on the replication site to a point in time (PIT);
determining that the PIT is before the LUN was removed from the consistency group;
exposing the PIT including the removed LUN.

4. The computer program product of claim 2 wherein making the LUN unavailable comprises marking the removed LUN on the replication site as a shadow LUN.

5. The computer program product of claim 4 wherein the code is further configured to enable:
deleting the shadow LUN when an inverse of a remove LUN is deleted from an undo portion of the journal.

6. The computer program product of claim 2 wherein making the LUN unavailable comprises reading data stored on the LUN on the replication site into the journal on the replication site and deleting the LUN.

7. The computer program product of claim 2 wherein the code is further configured to enable:
adding an opposite of a remove LUN command to an undo portion of the journal once the remove LUN command is applied from a do portion journal.

8. The computer program product of claim 2 wherein the code is further configured to enable:
determining that a point in time (PIT) is requested before the LUN was deleted;
creating a LUN on the system;
copying data from the journal corresponding to the deleted LUN to the created LUN; and
exposing the PIT with the created LUN.

9. The computer program product of claim 1 wherein the selected action is adding a LUN to the consistency group and wherein the code is further configured to enable the execution of:
marking a corresponding added LUN as dirty on the replication site;
synchronizing the added LUN on the production site and the dirty LUN on the replication site; and
marking the LUN as added in a checkpoint in the journal on the replication site.

10. The computer program product of claim 9 wherein the code is further configured to enable the execution of:
adding an inverse of an add LUN command to an undo portion of the journal when an add LUN command is processed from the do portion of the journal.

11. The computer program product of claim 9 wherein the code is further configured to enable the execution of:
upon receiving an IO to a non-exposed LUN on the replication site, wherein a non-exposed LUN is a LUN that is not present in a current point in time, failing the IO to the non-exposed LUN.

12. A computer implemented method enabled to be executed on one or more processors for use in replication of a consistency group on a production site to a replicated consistency group on a replication site; wherein each of the consistency groups is enabled to comprise Logical Unit Numbers (LUNs); the method comprising:
executing an action selected from a group consisting of removing a LUN from the consistency group on the production site and adding a LUN to the consistency group on the production site; wherein a copy of Input/Output (IO) directed to the consistency group on the production site is split to the replication site; wherein the action is performed maintaining a journal on the replication site tracking the changes to the consistency group at the production site on the replication site; wherein the journal enables the replicated consistency group on the replication site to be rolled to a Point In Time (PIT) within a protection window by applying data in the journal to the consistency group; and in response to a request to roll the consistency group to a point in time:

rolling the replicated consistency group on the replication site to a PIT using the journal;

determining if the time of the PIT is before the time the LUN was added;

based on a negative determination that the PIT is before the time the LUN was added, exposing the PIT on the replication site and the LUN; and based on a positive determination; not exposing the added LUN in the exposed PIT.

13. The method of claim 12 wherein the selected action is removing the LUN from the consistency group and the method further comprises:

marking the LUN as removed on the replication site in a do portion of the journal on the replication site; and making the LUN unavailable on the replication site once a remove LUN command is applied from the do portion of the journal.

14. The method of claim 13 wherein the method further comprises:

rolling the replicated consistency group to a point in time (PIT);

determining that the PIT is before the LUN was removed;

exposing the PIT including exposing the removed LUN; and adding the opposite of a remove LUN command to an undo portion of the journal once the remove LUN command is applied from a do portion journal.

15. The method of claim 13 wherein making the LUN unavailable comprises marking the removed LUN on the replication site as a shadow LUN.

16. The method of claim 13 wherein making the LUN unavailable comprises reading the LUN data on the replication site into the journal and deleting the LUN on the replication site.

17. The method of claim 12 wherein the selected action is adding a LUN to the consistency group and wherein the method further comprises:

marking a corresponding added LUN as dirty on the replication site;

synchronizing the added LUN on the production site and the dirty LUN on the replication site;

adding an inverse of an add LUN command to the undo portion of the journal when add LUN command is processed from the do portion of the journal; and marking the LUN as added in a checkpoint in the journal on the replication site.

18. A system for replication comprising:

a production site, the production site having a splitter and a consistency group; wherein the consistency group comprises volumes;

a replication site, the replication site having a journal and a replicated consistency group for replication of the consistency group; wherein the replicated consistency group comprises replicated volumes, the replicated volumes for replicating the volumes on the production site; and computer-executable logic operating in memory, wherein the computer-executable program logic is configured to enable execution of:

executing an action selected from a group consisting of removing a Logical Unit Number (LUN) from the consistency group on the production site and adding a LUN to the consistency group on the production site; wherein a copy of Input/Output (IO) directed to the consistency group on the production site is split to the replication site; wherein the action is performed maintaining a journal on the replication site tracking the changes to the consistency group at the production site on the replication site; wherein the journal enables the replicated consistency group on the replication site to be rolled to a Point In Time (PIT) within a protection window by applying data in the journal to the consistency group; and in response to a request to roll the consistency group to a point in time:

rolling the replicated consistency group on the replication site to a PIT using the journal;

determining if the time of the PIT is before the time the LUN was added;

based on a negative determination that the PIT is before the time the LUN was added, exposing the PIT on the replication site and the LUN; and based on a positive determination; not exposing the added LUN in the exposed PIT.

19. The system of claim 18 wherein the selected action is removing the LUN from the consistency group and the executable program logic is further configured to enable execution of:

marking the LUN as removed on the replication site in a do portion of the journal on the replication site; and making the LUN unavailable on the replication site once a remove LUN command is applied from a do portion of the journal.

20. The system of claim 18 wherein the selected action is adding a LUN to the consistency group and wherein the executable program logic is further configured to enable execution of:

marking a corresponding added LUN as dirty on the replication site;

synchronizing the added LUN on the production site and the dirty LUN on the replication site;

adding an inverse of an add LUN command to the undo portion of the journal when add LUN command is processed from the do portion of the journal; and marking the LUN as added in a checkpoint in the journal on the replication site.

* * * * *